(12) United States Patent
Alexander

(10) Patent No.: US 7,931,710 B2
(45) Date of Patent: Apr. 26, 2011

(54) STEAM GENERATOR TO CONTAIN AND COOL SYNTHESIS GAS

(75) Inventor: Kiplin C. Alexander, Wadsworth, OH (US)

(73) Assignee: Babcock & Wilcox Power Generation Group, Inc.

( * ) Notice: Subject to any disclaimer, the term of this patent is extended or adjusted under 35 U.S.C. 154(b) by 729 days.

(21) Appl. No.: 11/191,183

(22) Filed: Jul. 27, 2005

(65) Prior Publication Data

US 2008/0011247 A1    Jan. 17, 2008

(51) Int. Cl.
   *F22B 1/18*    (2006.01)

(52) U.S. Cl. .................. 48/67; 48/61; 122/7 D

(58) Field of Classification Search ............... 416/97 R; 123/41.01–41.85; 48/67
See application file for complete search history.

(56) References Cited

U.S. PATENT DOCUMENTS

| | | | | |
|---|---|---|---|---|
| 4,377,132 A * | 3/1983 | Koog et al. | .................. | 122/7 R |
| 4,481,014 A * | 11/1984 | Dorling | .............................. | 48/76 |
| 5,713,312 A * | 2/1998 | Waryasz | .......................... | 122/481 |
| 5,976,203 A * | 11/1999 | Deeke et al. | .................. | 48/62 R |
| 2002/0008337 A1 * | 1/2002 | Nagl | ............................. | 266/186 |

* cited by examiner

*Primary Examiner* — Alexa D Neckel
*Assistant Examiner* — Imran Akram
(74) *Attorney, Agent, or Firm* — Eric Marich

(57) ABSTRACT

A steam generator used to contain and cool the synthesis gas produced by coal gasification processes employs radiant and convection surfaces, and an integral gasifier, in a specific arrangement to achieve a cost-effective, compact design.

14 Claims, 4 Drawing Sheets ic side view of a first embodiment of a radiant synthesis gas cooler according to the present invention;

STEAM GENERATOR TO CONTAIN AND COOL SYNTHESIS GAS

FIELD AND BACKGROUND OF THE INVENTION

The present invention relates generally to the field of coal gasification and, in particular, to a steam generator used to contain and cool the synthesis gas produced by coal gasification processes.

Integrated gasification combined cycle (IGCC) power plants firing solid fuels have traditionally been higher capital cost and have had lower operating availability and reliability than competing solid fuel technologies such as pulverized coal combustion Rankine cycles. Primary components to be improved upon to make IGCC more competitive include uncooled gasifiers and radiant and convective synthesis gas coolers. Radiant synthesis gas cooler designs have a practical limitation of overall outside diameter due to the economics of pressure vessel containment and shipping size limitations to most power plant sites. Within these limits to vessel diameter, there is a need to maximize the compactness of the radiant heat transfer steam generating surface used to cool the gas to minimize the overall height of the radiant synthesis gas cooler.

U.S. Pat. No. 4,768,470 to Ziegler utilizes coaxial flues constructed of steam generating wall surface to shorten overall cooler height. This design provides for separate flues with independent water circuits to provide for individual lifting, removal and inspection of the inner and outer flues. Another design approach developed by The Babcock & Wilcox Company ca. 1992 utilizes a single flue of steam generating wall surface with additional steam generating surfaces ("wing walls") suspended inside the flue to maximize surface area and shorten cooler height. Other companies, such as GHH Mann employ similar designs.

Existing solutions still have not reduced the cost of this component to a competitive level. Single radiant cooler heights to cool synthesis gas for power plants using the largest commercial gas turbines can exceed 150 feet tall. Some plant designs have utilized two coolers, reducing overall height but further increasing costs. Additionally, redundant gasifiers, radiant coolers and convective coolers have been included in plant designs to improve plant operating availability, at a substantially higher cost.

Existing solutions for convective synthesis gas coolers require a separate component from the radiant cooler, with a cooled flue connecting the two components. Convective coolers designs include both water and steam tube designs (water or steam inside the tubes, gas outside) (Shell Oil Company) and fire tube designs (gas inside the tubes, water outside) (Steinmueller, others). Both of these designs require a pressure vessel enclosure and water/steam system, separate from the radiant cooler. Turbulence created in turns in the gas flue and at the inlet to the convective cooler have created a source of fuel ash fouling that can be difficult to manage.

Existing solutions for gasifiers include uncooled and cooled refractory enclosures. Uncooled enclosures (General Electric, Conoco, others) have experienced premature failures and frequent replacement. High availability with these designs typically requires a spare gasifier train, and/or firing the gas turbine on oil or gas at higher cost during repair time for the gasifier. Slow heat up and cool down times for thick refractory uncooled designs extend time during outages to repair or replace refractory. Existing cooled gasifier designs (Shell Oil Company, Future Energy) utilize separate water or steam generating circuits with a refractory coating to enclose and contain the gasifier gases. Some of these systems use low pressure, forced circulation cooling water systems that reject the heat outside of the power plant steam/water system, reducing efficiency. Prior art for containing hot solid fuel gases with molten slag in a combustion environment similar to this environment using steam generating surface integral with the downstream cooling circuitry includes Cyclone™ fired boilers (The Babcock & Wilcox Company).

It is thus clear that development of an economical, compact, reliable and robust synthesis gas cooler is critical to the future of IGCC systems at a commercial scale.

SUMMARY OF THE INVENTION

Accordingly, one aspect of the present invention is drawn to a synthesis gas cooler for extracting heat from synthesis gas produced by a gasification process. The synthesis gas cooler comprises a shell having an inlet and an outlet; a fluid-cooled inner flue contained within the shell for receiving the synthesis gas; a fluid-cooled outer flue contained within the shell for receiving the synthesis gas from the inner flue; radiant heat transfer surface located within the inner flue for cooling the synthesis gas; and means for conveying the synthesis gas from the outer flue to the outlet.

Another aspect of the present invention is drawn to a synthesis gas cooler as described above which employs an arrangement of convection heating surface, located within the outer flue, for further cooling the synthesis gas.

Yet another aspect of the present invention is drawn to a synthesis gas cooler which employs not only radiant and convective heating surface within the same shell, but also incorporates an integral gasifier.

The various features of novelty which characterize the invention are pointed out with particularity in the claims annexed to and forming a part of this disclosure. For a better understanding of the invention, its operating advantages and the specific benefits attained by its uses, reference is made to the accompanying drawings and descriptive matter in which preferred embodiments of the invention are illustrated.

DESCRIPTION OF THE PREFERRED EMBODIMENTS

Figure 1:
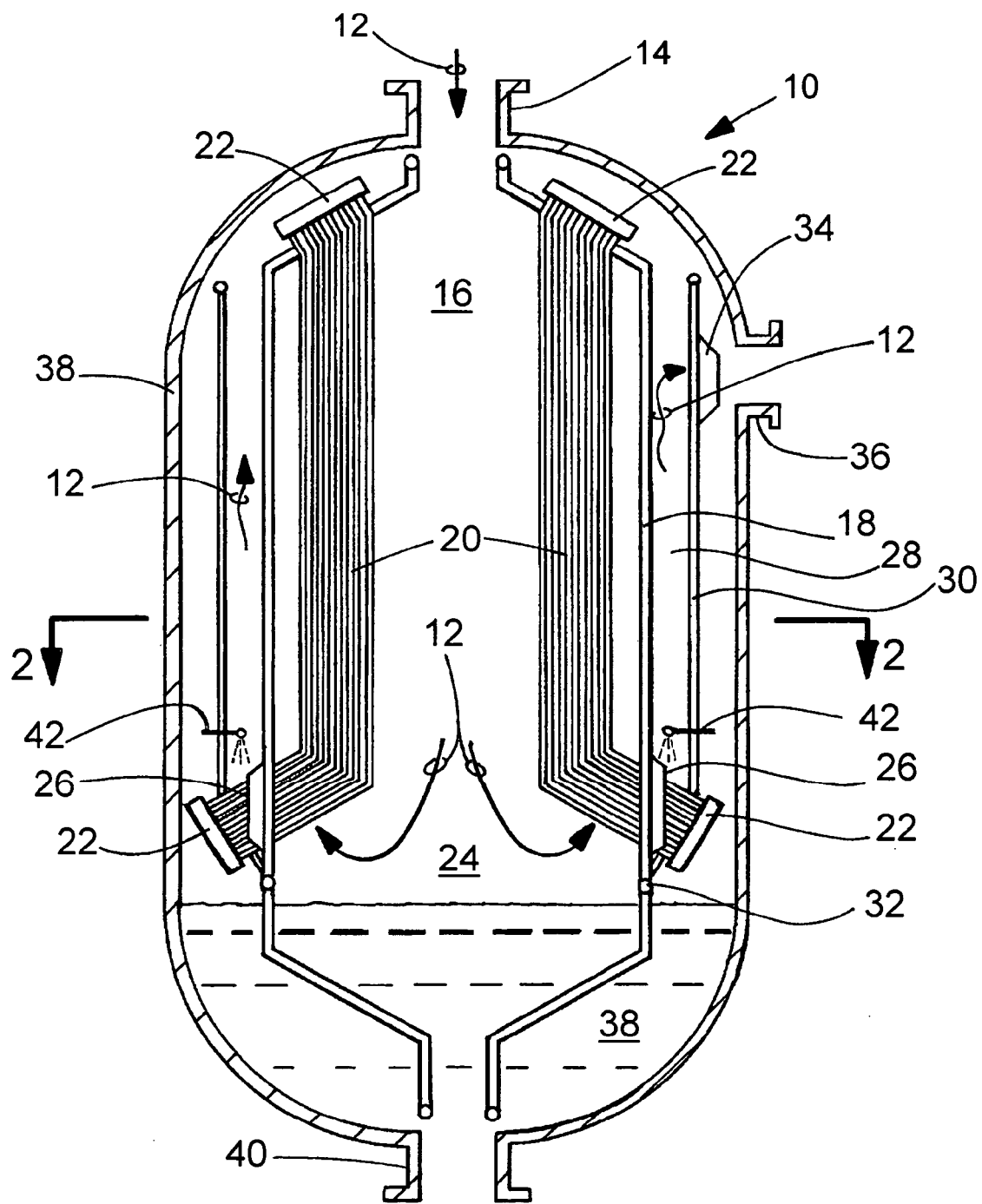
FIG. 1 is a schematic sectional side view of a first embodiment of a radiant synthesis gas cooler according to the present invention.
Figure 2:
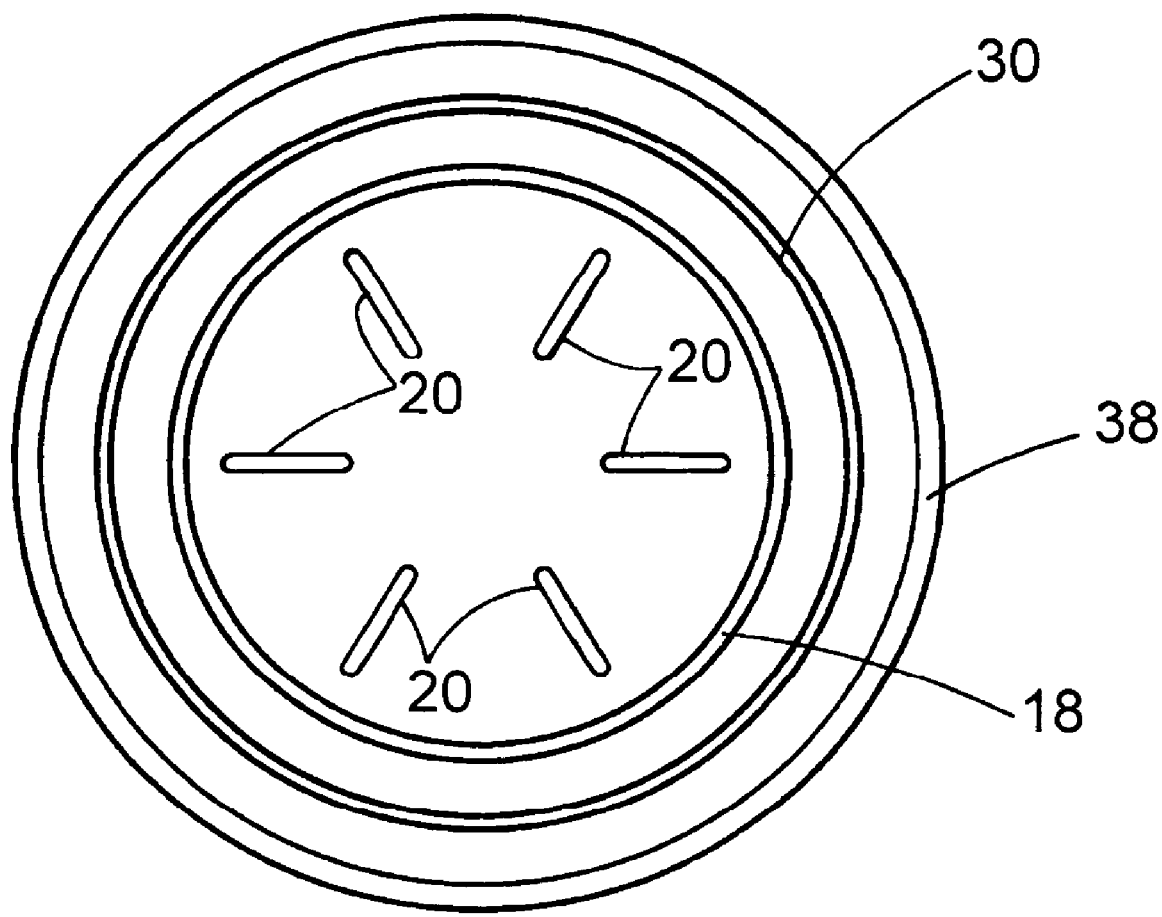
FIG. 2 is a sectional view of FIG. 1 viewed in the direction of arrows 2-2 of FIG. 1.

Referring to the drawings generally, wherein like reference numerals designate the same or functionally similar elements throughout the several drawings, and to FIG. 1 in particular, there is shown a schematic sectional side view of a first embodiment of the present invention, drawn to a radiant synthesis gas cooler, generally designated 10. The synthesis gas cooler 10 is typically a cylindrical vessel having its longitudinal axis oriented vertically. In this embodiment, the cooler 10 is provided with hot synthesis gas 12 from a gasifier (not shown) at an inlet 14 provided at the top of the cooler 10. The gas 12 enters an inner flue or enclosure region 16 provided within the cooler 10. The inner flue is defined by inner enclosure wall 18, preferably cylindrical in shape, and comprised typically of fluid-cooled tubes. The working fluid within the tubes may be water, steam or a mixture thereof. In addition to the fluid-cooled tubes forming the inner enclosure wall 18, the inner flue 16 is also provided with a plurality of fluid-cooled, wing wall surfaces 20 which are internally suspended within the cooler 10 so that a significant portion of the wing walls 20 are exposed to the incoming synthesis gas 12, thereby heating the working fluid (again water, steam or a mixture thereof) conveyed through the wing walls 20. The wing walls 20 are generally constructed as a planar bank of tubes provided adjacent to one another, and are provided with inlet and outlet manifolds or headers 22 which distribute or collect the working fluid conveyed through the wing walls 20. The number and arrangement of the wing walls 20 provided would be determined by heat transfer and other requirements. Thus, while FIG. 2 illustrates an arrangement of six (6) wing walls 20 arranged around the vertical longitudinal axis of the cooler 10, a greater or fewer number of wing walls 20 may be provided to suit particular heat transfer and cooling requirements. As the hot synthesis gas 12 flows down through the inner flue 16, it is cooled by the inner enclosure wall 18 and the wing walls 20, and at a bottom region 24 of the inner flue 16 the synthesis gas 12 turns upwardly substantially 180 degrees through one or more openings 26 provided in the inner enclosure wall 18 and then into an outer flue or enclosure region 28 defined by the inner enclosure wall 18 and a similarly constructed outer enclosure wall 30. The outer flue 28 thus has a substantially annular shape. Manifolds or headers 32 may be provided to facilitate formation of these openings 26, if necessary. The synthesis gas 12 is then conveyed upwardly through the outer flue 28, through one or more openings 34, and then out of the cooler 10 via synthesis gas outlet 36.

The distance between the inner enclosure wall 18 and the outer enclosure wall 30, as well as the distance between the outer enclosure wall 30 and a shell 38 forming the cooler 10 will be of a size sufficient to provide access and inspection when the cooler 10 is out of service. The enclosure walls 18, 30 forming the inner and outer flues 16, 28, respectively, will preferably be provided as independent fluid circuits to provide for individual lifting, removal and inspection. All water/steam generating surface will be arranged to provide for natural circulation, avoiding the need for a forced circulating system with circulation pumps. Solids entrained in the hot synthesis gas 12 flowing downwardly through the inner flue 16 will tend to fall out of the synthesis gas 12 at the bottom region 24 where the synthesis gas 12 makes an approximately 180 degree turn upwardly into the outer flue 28. The solids fall into a water bath 38 provided at a lower portion of the cooler 10, thereby permitting the solids to be cooled and removed via solids outlet 40. Sootblowers 42 may be provided at the openings 26 provided at the bottom region 24 where the synthesis gas 12 makes the 180 degree turn into the outer flue 28, if required to prevent pluggage from accumulated solids.

The combination of the inner and outer flues 16, 28, with the wing walls 20 located within the inner flue 16, results in an overall height of the cooler 10 that is substantially less than with either construction individually. Providing independent inner and outer flues 16, 28 with space for lifting and removal while accommodating the wing wall headers 22 and connections thereto (not shown) inside the inner flue 16 will require a novel inner flue 16 design, particularly at the bottom of the inner flue 16.

Figure 3:
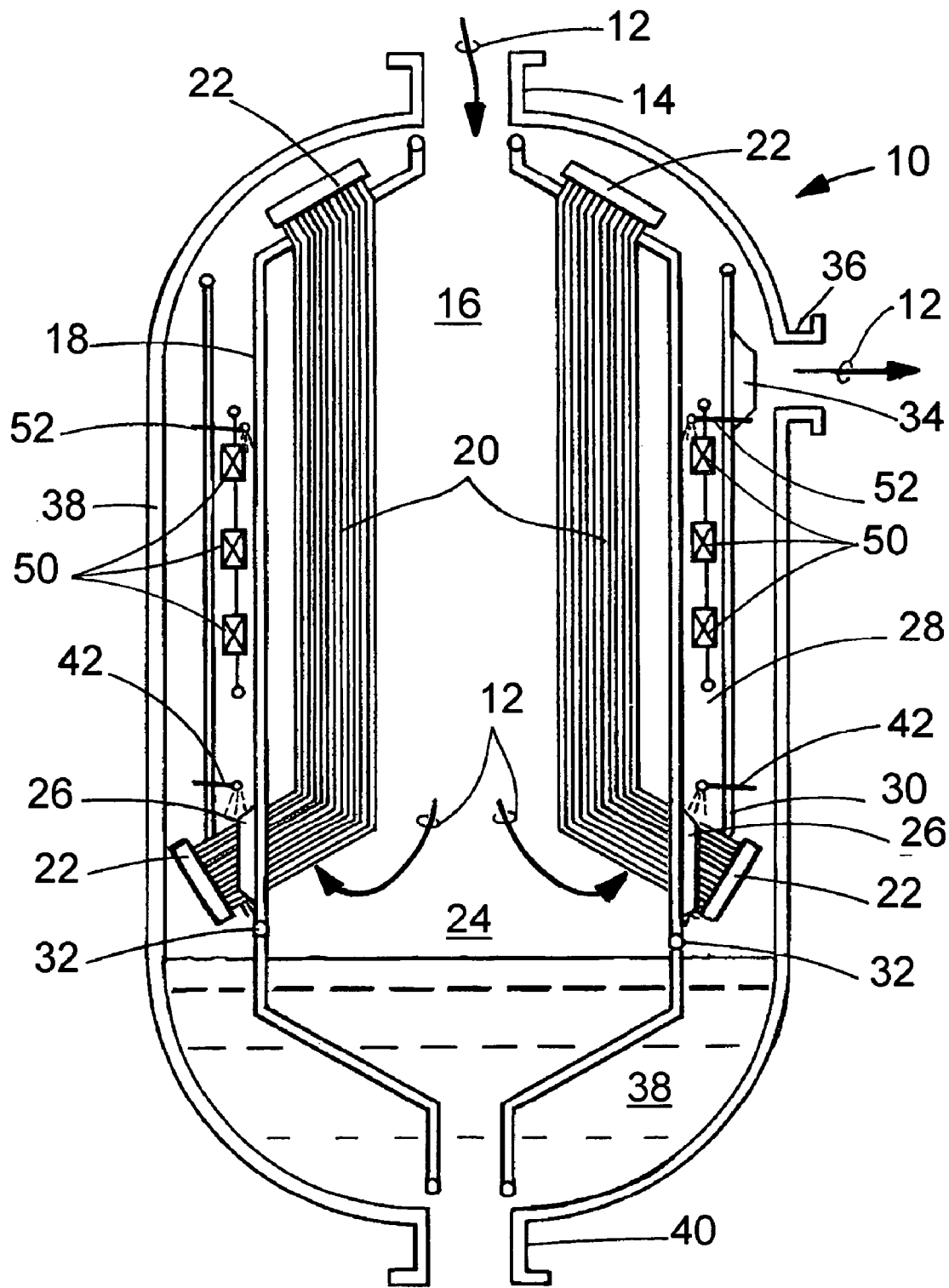
FIG. 3 is a schematic sectional side view of a second embodiment of a radiant synthesis gas cooler illustrating placement of convection heating surface according to the present invention.

Depending upon the amount of heat in the synthesis gas 12 provided to the cooler 10, additional heating surface may be required, and a second embodiment of the present invention to accomplish this task is illustrated in FIG. 3. As those skilled in the art will appreciate, the second embodiment shares several design features with the first embodiment of FIG. 1, and in particular also provides an arrangement of convection heating surface 50 arranged within the outer flue 28 as shown. This convection heating surface 50 can be water or steam cooled, and comprised of one or more banks of tubes arranged so that the synthesis gas 12 flows over the outside of the tubes. The banks of convection heating surface 50 may be provided within the outer flue 28 anywhere around the perimeter of the cooler 10. In one specific feature of this embodiment, the convection heating surface 50 may employ the same fluidic circuitry (an integrated cooling approach) as is employed in the steam generating surface comprising the inner and outer enclosure walls 18, 30, respectively, thus eliminating the need for a separate cooling system. Alternatively, a separate fluidic circuit may be employed for the convection heating surface 50. Synthesis gas 12, after flowing over the convection heating surface 50, exits the outer flue 28 via openings 34, and exits the cooler via gas outlet 36. Sootblowers 52 can be provided to clean the convection heating surface 50 to prevent pluggage.

The convection heating surface 50 eliminates the need for a convection cooler component separate and detached from the radiant cooler 10, as well as the otherwise attendant connecting flues with turns, pressure vessel containment for same and, in the case of the aforementioned integrated cooling approach, a separate cooling system. The synthesis gas 12 flowing from the radiant cooling section (the inner flue 16) upwardly over the convection heating surface 50 located within the outer flue 28 travels substantially in a straight line, minimizing gas turbulence at the inlet to the outer flue 28. This minimizes the potential for uncontrollable ash pluggage, and permits the ability to provide sootblowers 52 adjacent the convection heating surface 50 to clean same. This design is especially advantageous as compared to the turbulence and attendant uncontrollable pluggage problems typically encountered at the abrupt entrance to tubes at the inlet tubesheet of a fire tube cooler design.

Figure 4:
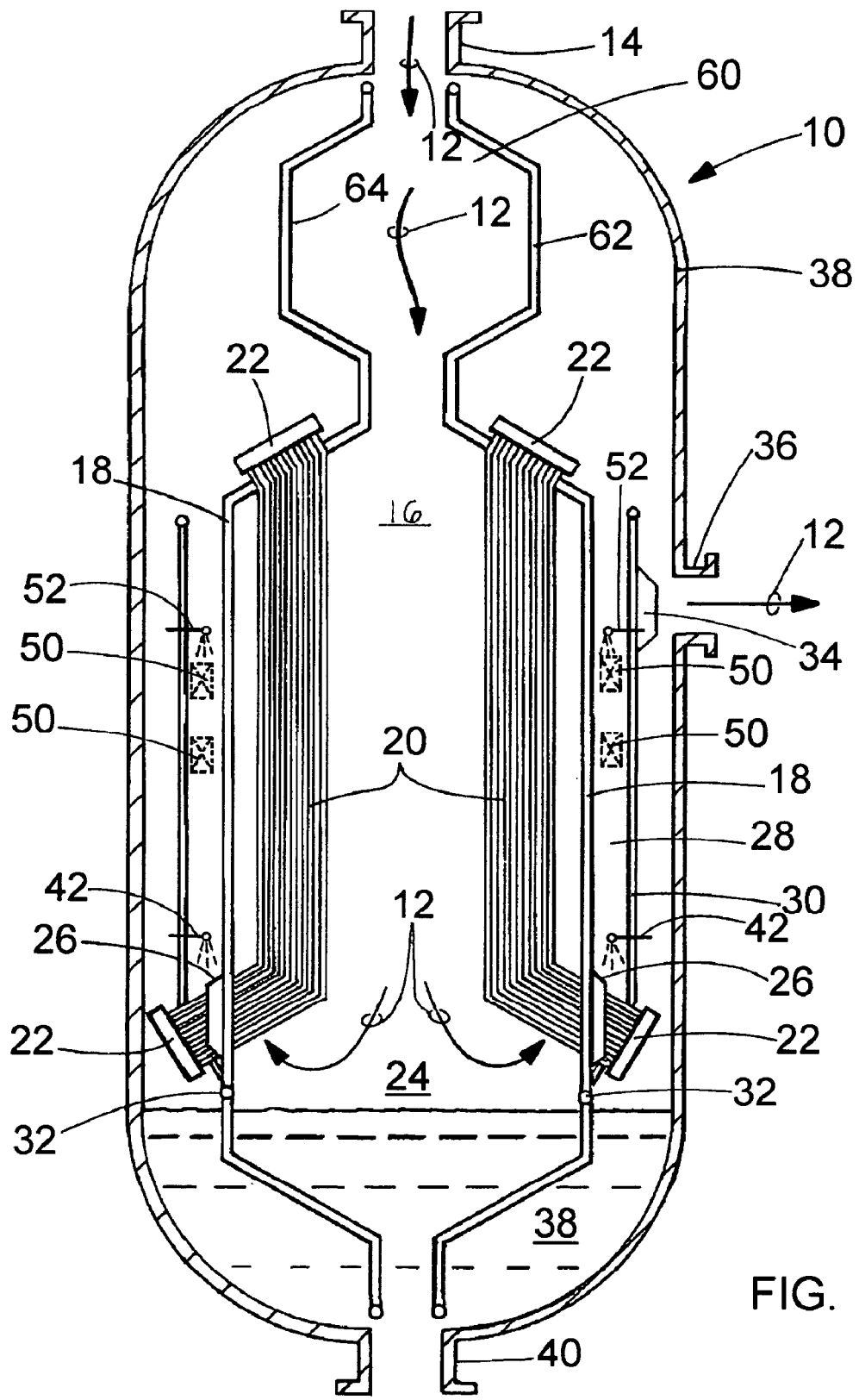
FIG. 4 is a schematic sectional side view of a third embodiment of a radiant synthesis gas cooler illustrating placement of an integral gasifier according to the present invention.

If desired, a further simplification of the structures and equipment employed in a gasification system can be accomplished by means of a third embodiment of the present invention, as illustrated in FIG. 4. As shown therein, this arrangement extends the tubes comprising the enclosure wall 18, and which defines the inner flue 16, upwardly to form an integral, fluid-cooled gasifier enclosure region 60 in an upper region of the cooler 10. The integral gasifier 60 is thus positioned within the cooler 10 to provide the synthesis gas 12 to the inner flue 16. The tubes forming the enclosure wall 62 of the gasifier enclosure region 60 would have a refractory coating 64 to protect the surface of the tubes from molten slag and to maintain the gasifier enclosure region 60 environment at temperatures sufficient for the proper gasification reactions to occur.

This gasifier enclosure region 60 according to the present invention overcomes the problems associated with uncooled, refractory gasifiers, as well as the prior art for cooled gasifiers. The present invention improves on prior cooled gasifier designs by integrating the cooling circuitry for the gasifier enclosure region 60 into the same fluid-cooled circuitry as that provided for the radiant cooler 10, eliminating the need for a separate cooling system. This design also recovers the heat rejected from the gasifier enclosure region 60 and transfers it into the gasification plant's steam/water system, thereby improving efficiency and providing modest fuel cost savings over the life of the unit.

The above discussion of each of the three design embodiments list the technical advantages of each over the prior art. From a commercial perspective, the combined inner/outer flue with wing wall design concept substantially reduces cost by significantly reducing the overall height of the radiant synthesis gas cooler. These cost reductions are obtained not just from the reduced cost of the outer vessel, but also from transportation costs, fuel piping costs, steel structure costs, and costs to construct the component on site. Providing separable inner and outer flues minimizes maintenance costs. This is important with a gasification process cooler, which experiences a more aggressive corrosion environment and requires more maintenance over time than combustion gas coolers used in a conventional pulverized coal plant.

The incorporation of the convection heating surface integrally within the radiant cooler enclosures eliminates the cost of a separate component. The cost savings are substantial here as well, because in addition to saving on an extra pressure vessel there are also savings in reduced gas flue and steam/water piping costs, steel structure costs and construction costs. The savings from higher availability on solid fuel, due to reduced or eliminated convective cooler plugging, can be more than the entire capital cost of a convective cooler over the life of the unit.

The incorporation of an integral, cooled gasifier provides modest cost savings over separate cooled gasifiers by eliminating the need for separate pressure vessels and some of the cooling circuitry. While it may be somewhat more expensive in capital cost as compared to an uncooled gasifier, it is believed that the higher availability using solid fuels will be substantial, greatly exceeding any capital cost difference.

The cost savings from combining some or all of the three design concepts to allow elimination of a spare component train are significant. Again, these savings expand beyond just the extra components to include all the supporting equipment and steel structures surrounding the components and the construction costs associated with building it. It will thus be appreciated that an important, fundamental improvement provided by the present invention involves consolidating individual components into one integrated component to make it compact, low cost, more reliable, and more maintainable.

While specific embodiments of the invention have been shown and described in detail to illustrate the application of the principles of the invention, those skilled in the art will appreciate that changes may be made in the form of the invention covered by the following claims without departing from such principles. In some embodiments of the invention, certain features of the invention may sometimes be used to advantage without a corresponding use of the other features. Accordingly, all such changes and embodiments properly fall within the scope of the following claims.

I claim:

1. A synthesis gas cooler for extracting heat from synthesis gas produced by a gasification process, comprising:
    a shell having a top end and a bottom end, an inlet provided at the center of said top end, and an outlet;
    a fluid-cooled inner flue contained within the shell for receiving synthesis gas, said inner flue having a body defined by an enclosure wall made of fluid cooled tubes;
    a fluid-cooled outer flue contained within the shell for receiving the synthesis gas from the inner flue, said outer flue being ring shaped, concentric with said inner flue and being at least two thirds a length of the inner flue;
    at least one radiant heat transfer surface, in addition to said inner flue enclosure wall, located within the inner flue for cooling the synthesis gas;
    means for conveying the synthesis gas from the outer flue to the outlet;
    wherein said inner and outer flues are independent so as to allow separation for maintenance and inspection; and
    wherein the at least one radiant heat transfer surface is comprised of fluid-cooled, wing wall surfaces internally suspended within the synthesis gas cooler so that a significant portion of the wing wall surfaces are exposed to the incoming synthesis gas, the wing wall surfaces being each comprised of a planar bank of tubes provided adjacent to one another, arranged along a vertical longitudinal axis of the synthesis gas cooler and provided with inlet and outlet manifolds which distribute a fluid conveyed through the wing walls.

2. The synthesis gas cooler according to claim 1, comprising a water bath at a lower portion of the synthesis gas cooler for receiving and cooling solids entrained in the synthesis gas and a solids outlet for removing the solids from the synthesis gas cooler.

3. The synthesis gas cooler according to claim 1, wherein the fluid-cooled outer flue is comprised of an enclosure wall made of fluid-cooled tubes.

4. The synthesis gas cooler according to claim 1, wherein the synthesis gas makes approximately a 180 degree turn at a bottom region of the synthesis gas cooler as the synthesis gas is conveyed from the inner flue to the outer flue.

5. The synthesis gas cooler according to claim 4, wherein the synthesis gas is conveyed through one or more openings in the enclosure wall making the inner flue.

6. The synthesis gas cooler according to claim 5, comprising sootblower means provided adjacent the one or more openings in the enclosure wall making the inner flue.

7. The synthesis gas cooler according to claim 3, wherein the means for conveying the synthesis gas from the outer flue to the outlet comprises one or more openings in the enclosure wall making the outer flue.

8. The synthesis gas cooler according to claim 1, comprising convection heating surface located within the outer flue for cooling the synthesis gas.

9. The synthesis gas cooler according to claim 8, wherein the convection heating surface comprises one or more banks of tubes arranged so that the synthesis gas flows over the outside of the tubes.

10. The synthesis gas cooler according to claim 8, comprising sootblower means provided adjacent the convection heating surface to clean same.

11. The synthesis gas cooler according to claim 1, comprising a fluid-cooled integral gasifier contained within the shell for producing synthesis gas, the integral gasifier providing synthesis gas to the inner flue.

12. The synthesis gas cooler according to claim 11, wherein the integral gasifier is located at an upper region of the synthesis gas cooler and is comprised of an enclosure wall made of fluid-cooled tubes.

13. The synthesis gas cooler according to claim 12, wherein the fluid-cooled inner flue is comprised of an enclosure wall made of fluid-cooled tubes, and the fluid-cooled tubes forming the inner flue extend upwardly to form the enclosure wall of the integral gasifier.

14. The synthesis gas cooler according to claim 12, wherein the fluid-cooled tubes of the enclosure wall forming the integral gasifier are coated with a refractory coating.

* * * * *